United States Patent [19]
Slavejkov et al.

[11] Patent Number: 5,575,637
[45] Date of Patent: Nov. 19, 1996

[54] METHOD AND DEVICE FOR LOW-$NO_x$ HIGH EFFICIENCY HEATING IN HIGH TEMPERATURE FURNACES

[75] Inventors: Aleksandar G. Slavejkov, Allentown; Thomas M. Gosling, Bethlehem; Robert E. Knorr, Jr., Allentown, all of Pa.

[73] Assignee: Air Products and Chemicals, Inc., Allentown, Pa.

[21] Appl. No.: 334,208

[22] Filed: Nov. 4, 1994

[51] Int. Cl.⁶ ........................................................ F23C 5/00
[52] U.S. Cl. ............................. 431/8; 431/10; 431/187; 431/353
[58] Field of Search ............................. 431/8, 9, 10, 353, 431/187, 354, 189; 239/417, 417.3, 420, 424, 416, 416.5

[56] References Cited

U.S. PATENT DOCUMENTS

| | | | |
|---|---|---|---|
| 3,547,568 | 12/1970 | Shisler | 431/353 |
| 3,676,048 | 7/1972 | Sellors, Jr. et al. | 431/353 |
| 3,976,420 | 8/1976 | Takahashi et al. | 431/10 |
| 5,199,866 | 4/1993 | Joshi et al. | 431/187 |
| 5,256,058 | 10/1993 | Slavejkov et al. | 431/187 |
| 5,302,112 | 4/1994 | Nabors, Jr. et al. | 431/8 |
| 5,346,390 | 9/1994 | Slavejkov et al. | 431/8 |

*Primary Examiner*—James C. Yeung
*Attorney, Agent, or Firm*—Robert J. Wolff

[57] ABSTRACT

An oxy-fuel burner for producing a generally flat luminous flame, the burner having fuel passage terminating in a nozzle, the fuel passage and nozzle having a generally elongated cross-section, a housing of complementary shape surrounding the fuel passage, so that when fuel is introduced into the fuel passage and an oxidizer is introduced into the passage defined by a space between the housing and the fuel passage a generally flat luminous flame is produced at the nozzle end of the fuel conduit. A precombustor having a cross-sectional shape complementary to that of flame end of the burner can be disposed on the flame end of the burner housing to further enhance combustion and protect the burner from the furnace atmosphere.

17 Claims, 13 Drawing Sheets

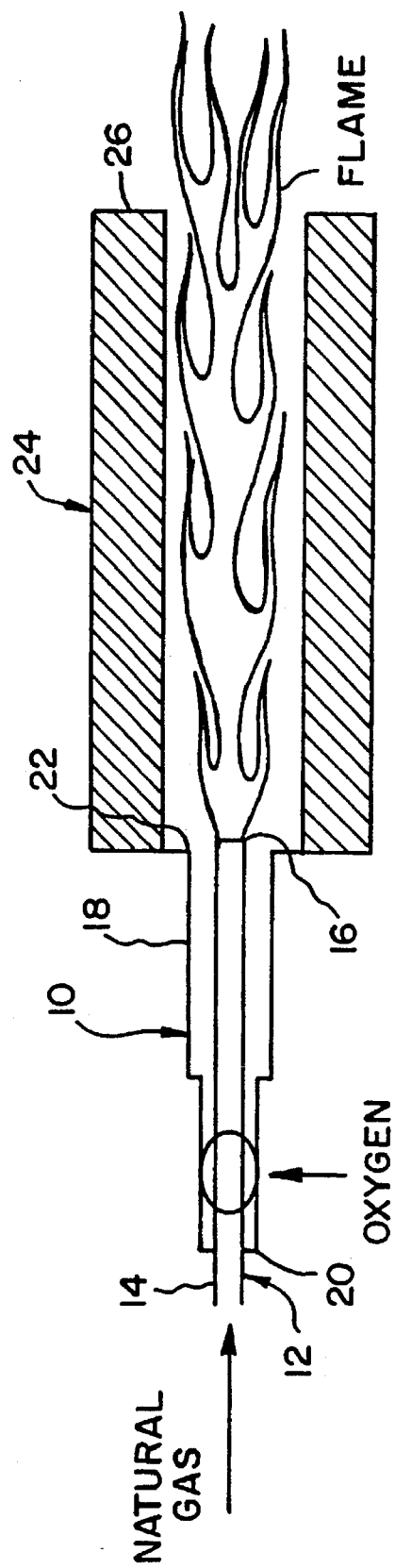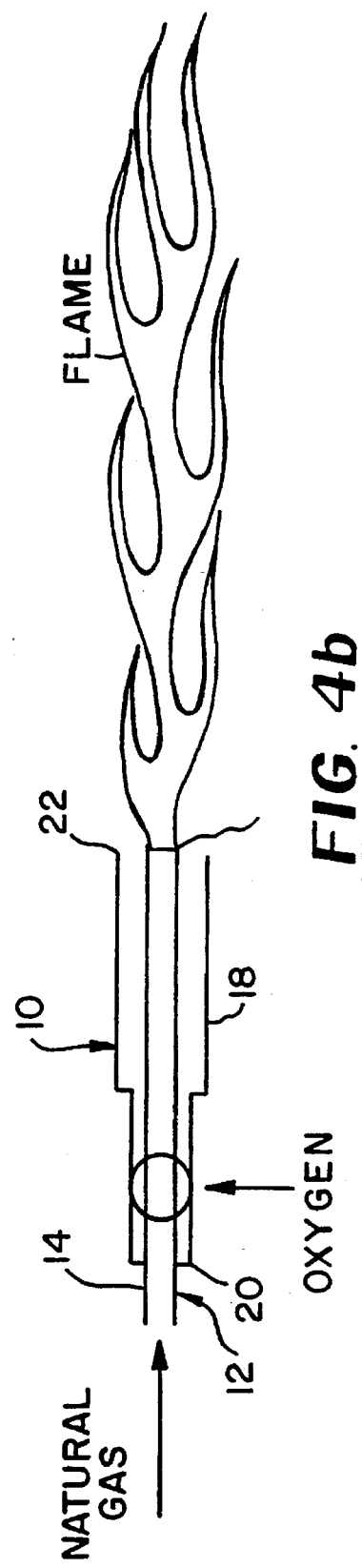
FIG. 4a
FIG. 4b

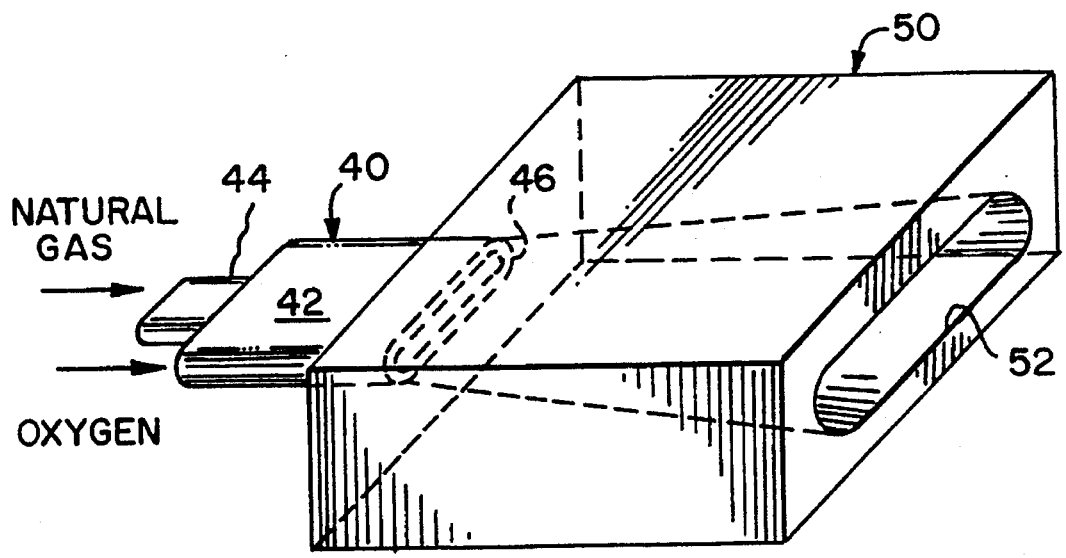
FIG. 5a
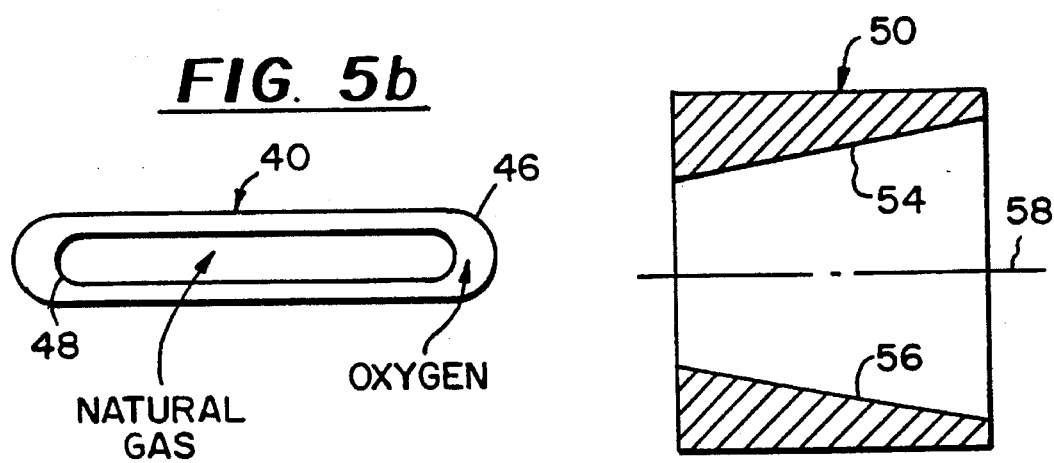
FIG. 5b
FIG. 5c
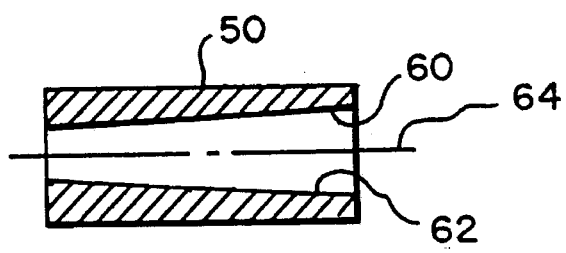
FIG. 5d

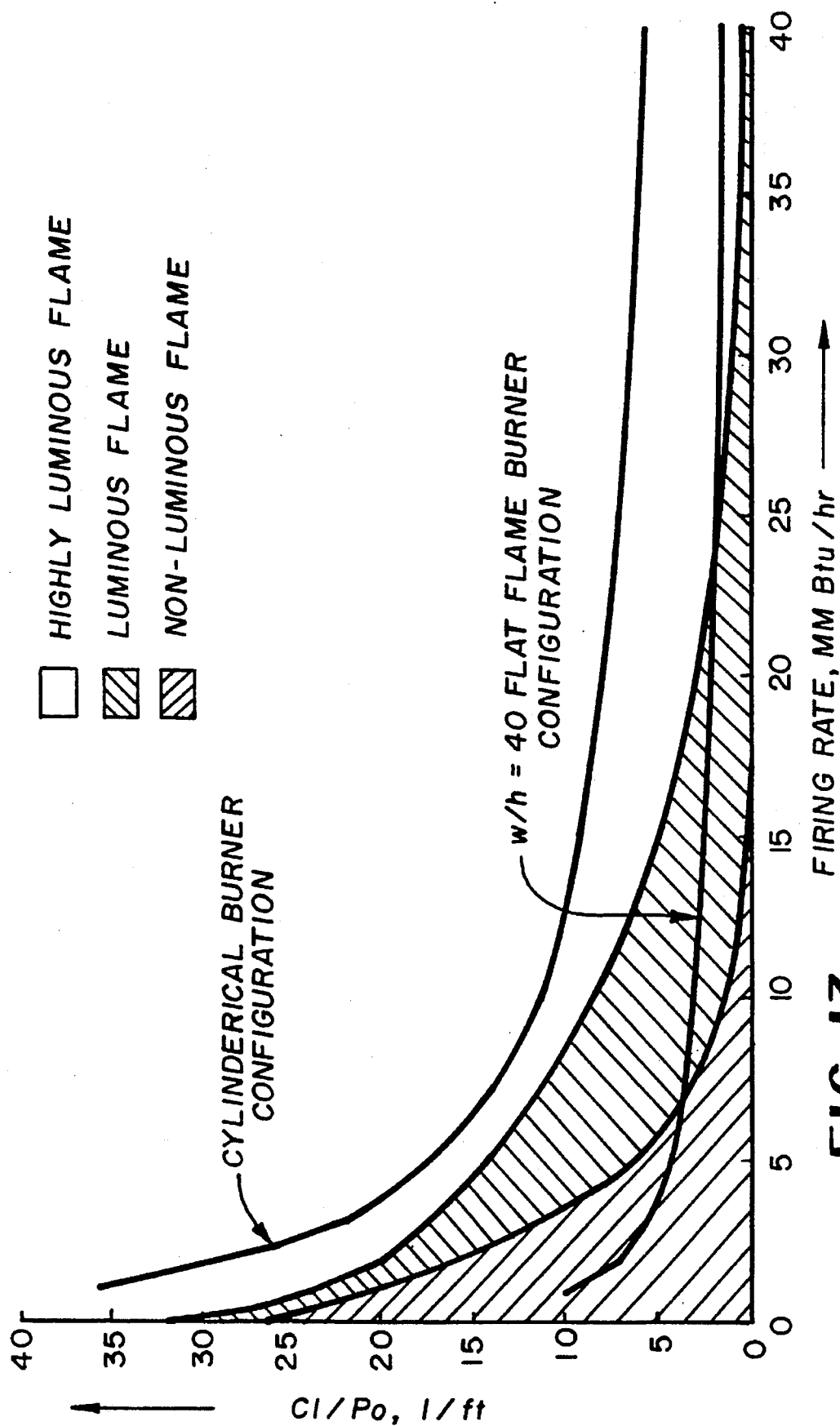

METHOD AND DEVICE FOR LOW-NO$_x$ HIGH EFFICIENCY HEATING IN HIGH TEMPERATURE FURNACES

FIELD OF INVENTION

The present invention pertains to oxy-fuel heating devices used for producing elevated temperatures in industrial melting furnaces for such diverse products as metals, glass, ceramic materials and the like.

BACKGROUND OF THE INVENTION

In attempting to reduce the emissions, a wide array of industrial applications have implemented significant changes through their combustion systems, including the use of oxygen-enriched combustion. The benefits of replacing air with oxygen include NO$_x$ and particulate reduction, improved production rates, fuel savings, and the reduction of capital requirements for furnace rebuilding. However, burner systems used for oxygen combustion often perform poorly and suffer such problems as corrosion, material build-up, and low flame luminosity. Most oxy-fuel burners are water cooled, thus requiring frequent maintenance to prevent loss of cooling and subsequent catastrophic failure of the burner. Also, the oxy-fuel flames produced by such burners have much smaller flame coverage than manufacturers are used to having with air-based combustion systems. In some applications, this results in local overheating and disruption of normal furnace operation.

U.S. Pat. Nos. 5,199,866, 5,256,058, and 5,346,390 pertain to burners and methods for producing luminous flames at low flow rates. According to the patentees, such flames are produced by surrounding a core of a fuel rich phase with an oxygen rich phase. It has been found that such burners have low flame luminosity at higher burning rates. In general, increasing the size of the cylindrical or axy-symmetrical shaped burners yields only minor increases in flame luminosity. Flames having low luminosity cannot release heat efficiently and produce high flame temperatures which in turn yield high NO$_x$ emissions in furnaces that are not well sealed or when operating with fuels or oxidizers containing nitrogen. Flame coverage is limited to the cylindrical flame shape produced with these and other axy-symmetric oxy-fuel or oxygen enriched air burners.

U.S. Pat. No. 5,302,112 discloses a flat flame burner which produces the flat flame by having two independent fuel jets intersect inside a furnace to produce a flame flattening effect.

The foregoing are attempted solutions at a frequently encountered problem with full or partially combustion-heated furnaces which result in high emission of pollutants, such as NO$_x$i, CO$_2$, and particulates. Regulations of such emissions are becoming more stringent and the regulated industries must change their operations to comply with the emission limits.

SUMMARY OF THE INVENTION

In order to overcome problems with prior art burners and combustion systems, it has been discovered that a flat flame burner, wherein the fuel-rich phase surrounded by the oxygen-rich phase, is shaped in the form of an elongated or generally flat rectangle, flame luminosity is dramatically increased, thus enhancing heat transfer while reducing the NO$_x$ emissions. According to the present invention, the burner contains a fuel passage having a generally elongated cross-section which is surrounded by a housing having a complementary cross-section, the housing being larger than the fuel passage to create a passage between the housing and the fuel passage. In a preferred embodiment, the housing and the fuel passage have a common end which lies in a plane generally perpendicular to the axis of the burner, to thus produce the flat flame having the fuel-rich core surrounded by the oxygen-rich phase or sheath. It is also possible to achieve the same effect by having the fuel passage retracted inside the housing or projecting outside of the housing. According to the invention, a pre-combustor can be disposed on the flame end of the burner to further enhance operating characteristics of the burner. When using a precombustor, the end of the fuel passage can be positioned at various locations from positions retracted into the housing or positions extending from the end of the housing to the flame end of the precombustor.

BRIEF DESCRIPTION OF THE DRAWING

FIG. 4a is a schematic cross-section of a combustion system according to the present invention.

FIG. 4b is a schematic cross-section of a burner according to the present invention.

FIG. 5a is a schematic perspective view of an apparatus according to the present invention.

FIG. 5b is a front elevational view of the burner of FIG. 5a.

FIG. 5c is a vertical cross section of the precombustor of FIG. 5a.

FIG. 5d is a vertical cross section of the precombustor of FIG. 5a.

FIG. 13 is similar to the plot of FIG. 11 with the addition of curves of the flame luminosity for a round burner and a flat burner fired with an average natural gas velocity at the exit end of the nozzle of 40 feet/sec.

DETAILED DESCRIPTION OF THE INVENTION

The present invention is a method for increasing flame radiation, i.e. luminosity, and a device for producing a broad/flat flame for more uniform heating in furnaces. It is believed that cylindrical (axy-symmetrical) geometry burners have been intentionally or unintentionally operated in the high luminosity mode by those skilled in the art. The reason for discussing the cylindrical type burners is to show that a device in accord with this invention always produces higher flame radiation even when compared to the optimized cylindrical geometry burners.

The following is a list of terms and assumptions used in describing this invention:

Oxygen=oxidizer gas with >30% $O_2$, preferably 80%–100% $O_2$.

Fuel=any gaseous hydrocarbon fuel. While higher hydrocarbons usually produce luminous flames, natural gas flames are usually not luminous, so the emphasis in the discussion below is on the natural gas as fuel. However, it is within the present invention to expect increases in flame luminosity with other gaseous fuels.

Burner nozzles=this invention refers to burner nozzles of various cross section geometries, where natural gas is introduced through the center nozzle and oxygen around it.

Precombustor=sometimes referred to as the burner block, refractory tile, etc. A precombustor is usually made of a refractory material. However, the precombustor can be made from other high temperature materials such as metals, and, depending on the application, can be cooled. A precombustor plays a key role in shielding the burner from corrosive species and high furnace temperatures. The following discussion addresses both types of burner applications, i.e. with and without a precombustor.

Combustion experts use the term "flame luminosity" to describe the intensity of yellow/orange light emission from flames. In some heating applications, such as glass and metals melting, the luminosity is associated with higher heating efficiency, i.e. it is believed that the flames with high luminosity produce higher radiation which in turn saves energy and reduces production costs. Also, some furnace operators believe that highly luminous flames produce higher quality product. The flame luminosity is not a directly measurable quantity and is subjectively judged by furnace operators looking at the flame. While this method seems to be rough and inaccurate, it does provide a qualitative feedback on the flame radiation. In general, most of the natural gas flame radiation comes from the products of combustion, i.e.: $H_2O$ and $CO_2$ which have several peaks at around 2.4, 2.8, and 4.4 μm. this radiation is not visible and does not affect flame luminosity directly; Soot, defined as a byproduct of localized incomplete combustion, produces broad band radiation from visible (yellow/red) to higher wavelengths. The soot particles can be viewed as small solid particles radiating some kind of black body radiation at the flame temperature.

Figure 1:
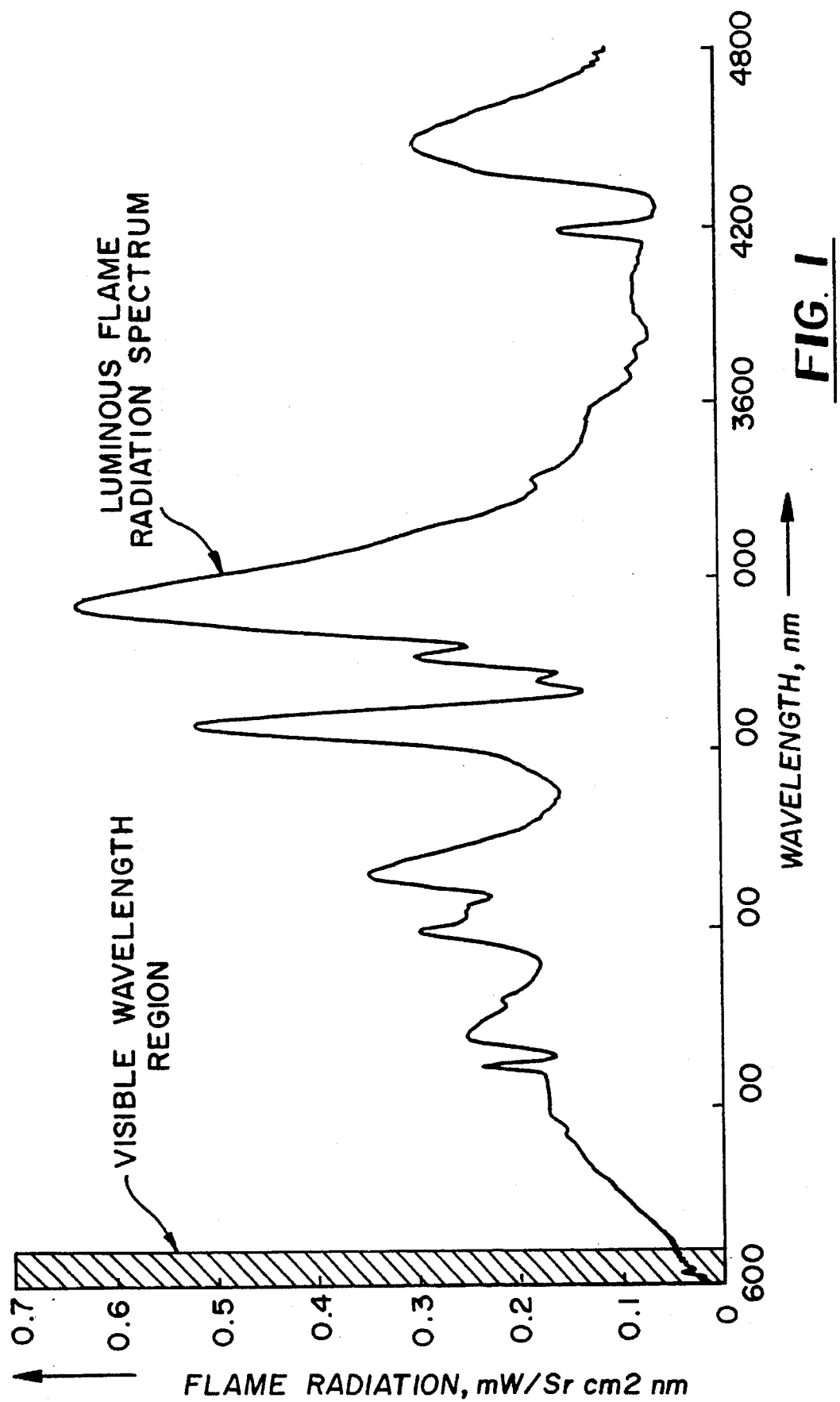
FIG. 1 is a plot of flame radiation against wavelength for a luminous flame.
Figure 2:
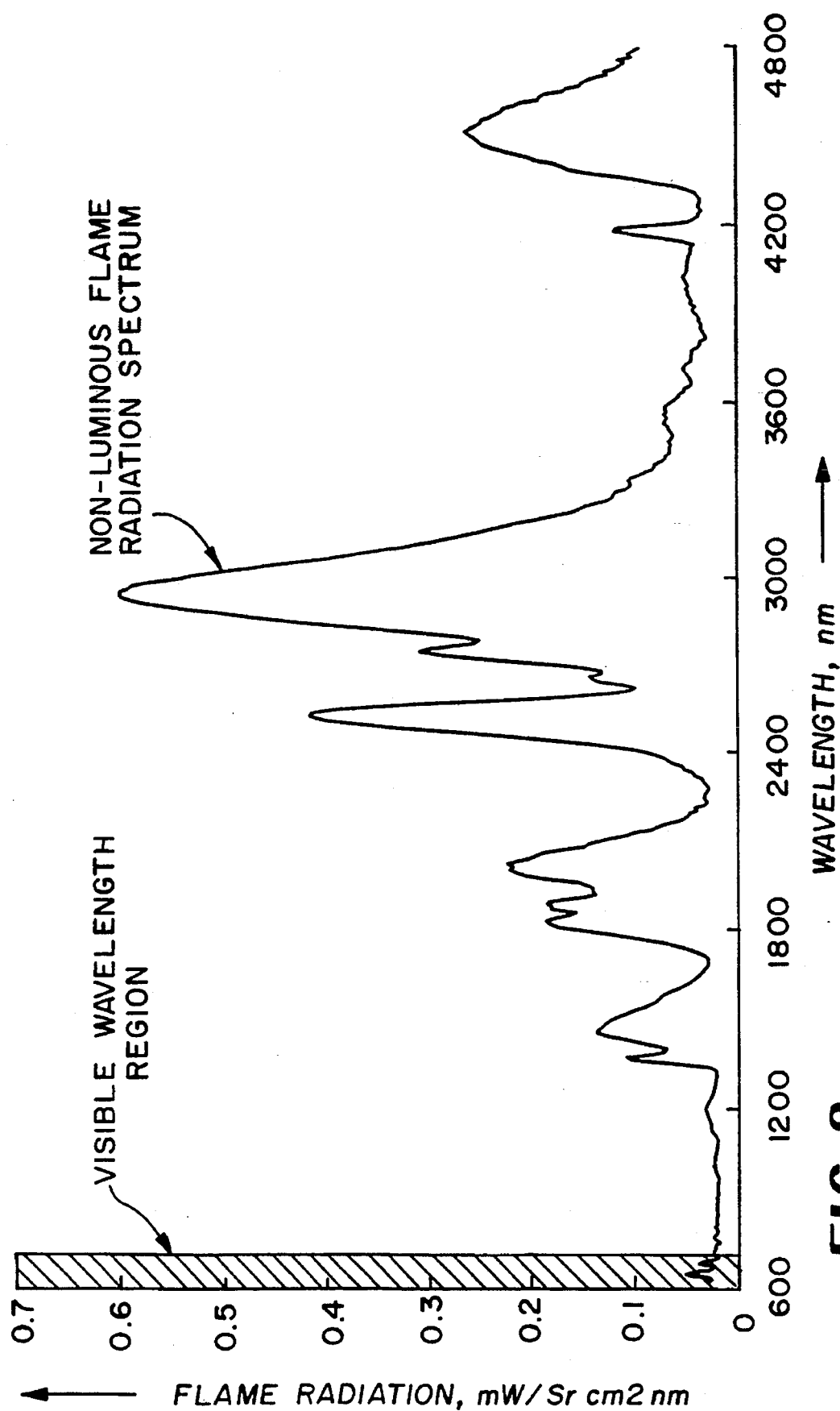
FIG. 2 is a plot of flame radiation against wavelength for a non-luminous flame.

The relationship between the flame radiation and the visible band is shown in FIGS. 1 and 2 for a luminous and a non-luminous flame, respectively.

As shown in FIGS. 1 and 2 the total radiation from the luminous flame is higher than that of the non-luminous flame, the difference being the soot radiation. While the radiation in the visible band is of relatively low intensity it is still proportional to the intensity of the overall soot radiation providing a valid feedback about the flame luminosity when observed by the furnace operators.

Flame luminosity is used here as the optimization quantity. The flame luminosity is normalized against the total flame radiation in order to eliminate inherent differences and allow comparisons of flame luminosity for different burners and firing rates. It is assumed that most of flame radiation is in the 600–4800 nm range, so that the normalized luminosity is given as the ratio of soot-induced radiation vs. total radiation, i.e.

$$\Theta = \frac{I(600-1500 \text{ nm})}{I(600-4800 \text{ nm})} \quad (1)$$

where $\Theta$—normalized flame luminosity $$I(600-1500 \text{ nm}) \, d\lambda = \int_{600}^{1500} I(\lambda) \, d\lambda = \text{flame radiation between 600 and 1500 nm}$$

$$I(600-4800 \text{ nm}) \, d\lambda = \int_{600}^{1500} I(\lambda) \, d\lambda = \text{flame radiation between 600 and 4800 nm}$$

For example, applying the equation (1) to the sample flames given in FIGS. 1 and 2, one can calculate the following normalized luminosity $\Theta$ (luminous flame in FIG. 1)=0.15

$\Theta$ (non-luminous flame in FIG. 2)=0.06

The numbers illustrate that these sample luminous and non-luminous flames produce about 15% and 6% radiation in the 600–1500 nm wavelength region respectively. One should note that the total soot-induced radiation is not limited to the 600–1500 nm band, but is also present at higher wavelengths. The normalized luminosity $\Theta$, thus, represents only a fraction of the total soot-induced flame radiation.

Figure 3:
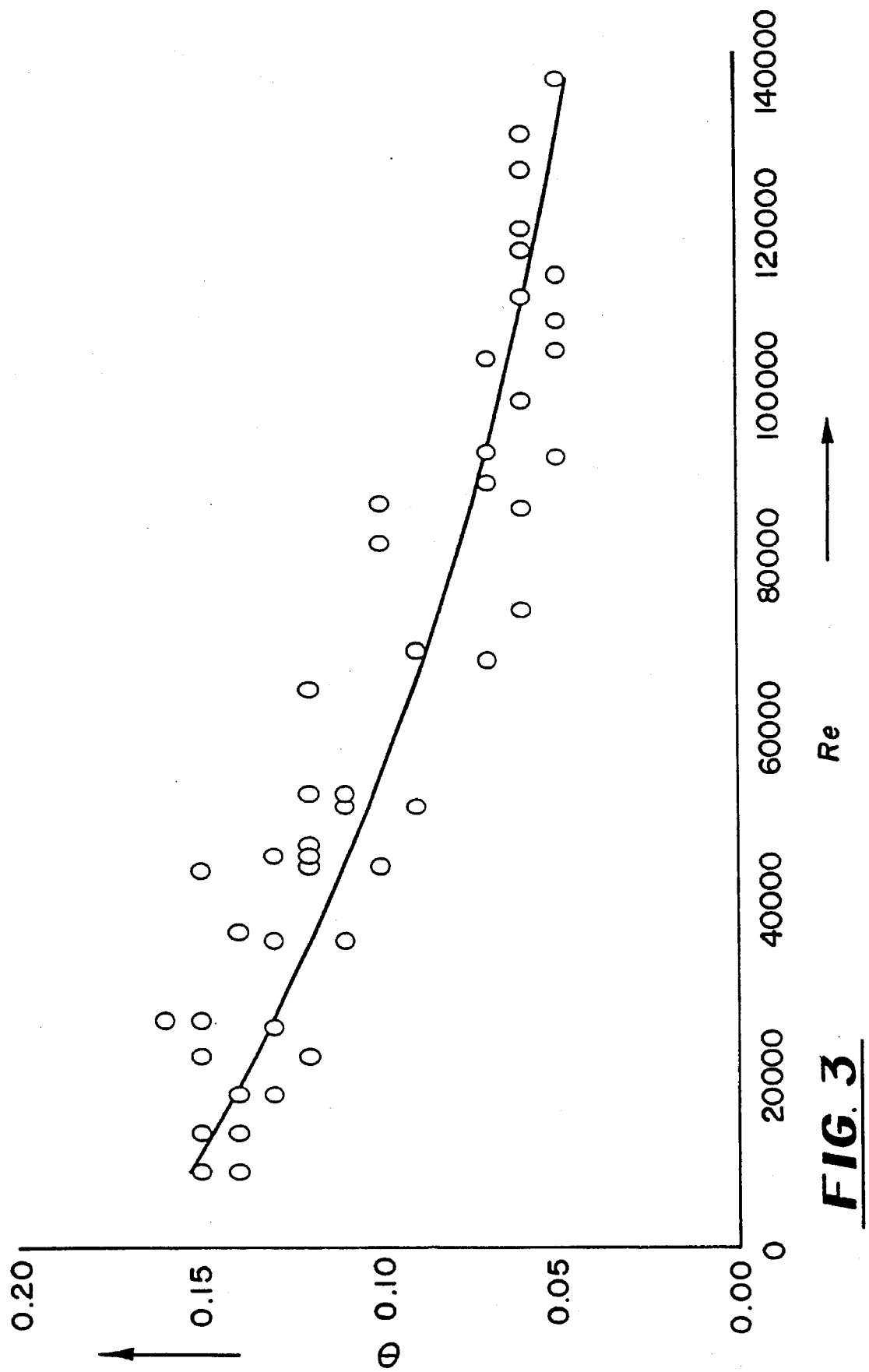
FIG. 3 is a plot of flame luminosity against Reynolds number.

The method of present invention is based on a surprising relationship between the normalized flame luminosity $\Theta$ and Reynolds Number (Re) of the reacting gases. It was found through extensive testing of burner prototypes that the normalized flame luminosity $\Theta$ decreases with increasing Re of the flame, i.e. combusting gases. The observed correlation is shown in FIG. 3 and its best fit is $$\Theta = 0.166 \cdot \exp(-9.2 \times 10^{-6} \text{ Re}) \quad (2)$$

This relationship stands for burners with or without a burner block, i.e. precombustor, with Reynolds number calculated at the location of flame introduction in a furnace i.e.: at the natural gas nozzle exit for burners without a precombustor, and at the precombustor exit for burners with a precombustor.

FIG. 4a is a schematic representation of a burner 10 having a central fuel conduct 12 having a first or utility end 14 and a nozzle end 16. Nozzle end 16 terminates in a plane perpendicular to the longitudinal axis of the fuel conduit 12. Burner 10 includes a housing 18 having a first or utility end 20 and a flame end 22, the flame end generally terminating in the same plane as nozzle end 16 of fuel conduit 12. The fuel conduit 12 and housing 18 are concentrically disposed on a common longitudinal axis, i.e. the axis of the fuel conduit 12. Disposed on the flame end 22 of housing 18 of burner 10 is a precombustor 24, the function of which is described in U.S. Pat. Nos. 5,256,058 and 5,346,390, the specifications of which are incorporated herein by reference. The Reynolds Number for this system is calculated at the exit or flame end 26 of precombustor 24.

FIG. 4b is a schematic representation of the burner 10 without the precombustor. For the burner of FIG. 4b the Reynolds number (Re) is calculated at the nozzle end 16 of fuel conduit 12.

In order to establish a relationship between the flame luminosity and critical burner design parameters, one needs to express Reynolds number as a function of burner firing rate. The Reynolds number is defined as $$Re = \frac{v_f d_f}{\eta_f} \quad (3)$$

where:

Re—Reynolds number of reacting gases at average flame temperature $$v_f = \begin{cases} v_o, & \text{w/o precombustor} \\ v_p, & \text{w/precombustor} \end{cases}$$

Subscript $f$ denotes position at which flame is measured, either at precombustor end or burner nozzle end; Subscript $o$ denotes position at burner nozzle end; Subscript $p$ denotes position at precombustor end
$v_o$—average natural gas nozzle exit velocity
$v_p$—average velocity of reacting gases at the exit of precombustor
$\eta_f$—kinematic viscosity of reacting gases at average flame temperature $$\eta_f = \begin{cases} \eta_o, & \text{w/o precombustor} \\ \eta_p, & \text{w/precombustor} \end{cases}$$

$$d_f = \begin{cases} d_o, & \text{w/o precombustor} \\ 0.9 d_p, & \text{w/precombustor} \end{cases}$$

$d_o$—natural gas nozzle hydraulic diameter
$d_p$—hydraulic diameter of precombustor exit
0.9 is flame expansion factor; it is used to account for the flame expansion at the exit of precombustor because the flame does not touch the wall of precombustor Hydraulic diameter $d_{hydraulic}$ is used here to allow comparison between different nozzle geometries, i.e. cylindrical and rectangular cross section nozzles. It is defined as $$d_{hydraulic} = \frac{4A}{P} \quad (4)$$

where:
A=cross sectional area
P=perimeter (length)

The precombustor is assumed to have a somewhat larger cross section than the oxygen burner nozzle but similar geometry. It can be diverging or converging and its length is assumed similar to standard furnace wall thicknesses, i.e. no more than 24 inches. As mentioned above, the precombustor plays a significant role in burner operation, such as enabling the reacting gases to accelerate. For the correlation purpose, the flame acceleration factor is assumed to be 3, i.e.

$$v_p = 3 v_o \quad (5)$$

This appears to be a good approximation for precombustor geometries covered by this invention and described as $$2 \leq \frac{d_p}{d_o} \leq 6 \quad (6)$$

The burners with burner blocks of $d_p/d_o > 6$ can be considered operating without a precombustor, since such a large burner block would not significantly affect the flame. The burners with burner blocks of $d_p/d_o < 2$ would operate under the present invention only if burner blocks are no longer than 12 inches. Anything longer than that would produce very high reactant mixing and high flame temperatures which would be detrimental to the longevity of the burner and burner block.

Natural gas nozzle velocity can be expressed in terms of firing rate, i.e.

$$v_o = \frac{FR}{A_o} \quad (7)$$

where
FR=burner firing rate
$A_o$=cross section area of natural gas nozzle

Combining equations (3), (4), and (7) results in the equation $$Re = \frac{FR}{\eta_f} \cdot \frac{C}{P_o} \quad (8)$$

As the result of combining the equations and assuming $d_p/d_o = 4$, then the coefficient C is equal to 4 for a burner without a precombustor and 43.2 for a burner system with a precombustor.

To allow comparison of Reynolds numbers calculated for cases with and without precombustors, kinematic viscosity for the two cases must be correlated. To that end, one can estimate gas viscosity as a function of temperature, as shown in The Property of Gases and Liquids, C. R. Reid, J. M. Prausnitz and B. E. Poling, McGraw-Hill (1987), using $$\eta_f = a \cdot T_f^{1.5} \quad (9)$$

where
a—constant $$T_f = \begin{cases} T_o, & \text{ambient temp. at the nozzle end} \\ T_p, & \text{avg flame temp. at precombustor exit} \end{cases}$$

It is reasonable to expect that $T_p > T_o$ as the flame develops inside the precombustor. Computer modeling studies indicate that for burners operating with $v_o < 400$ ft/s, precombustor geometries defined by eq. (6), and the length not exceeding 24 inches $$\frac{T_p}{T_o} \approx 2.5 \quad (10)$$

Combining eq. (9) and (10) at burner nozzle and precombustor exit positions yields $$\frac{\eta_p}{\eta_o} = \left(\frac{T_p}{T_o}\right)^{1.5} \approx 4 \quad (11)$$

which allows equation (8) to be rewritten as $$Re = \frac{FR}{\eta_o} \cdot \frac{C_1}{P_o} \quad (12)$$

which becomes the governing equation (12). This equation can be used to explain the principles of the present invention. For a given fuel ($\eta_o$=const.) and a fixed firing rate (FR=const.) Re number decreases when $P_o$ increases. As shown before with equation (2), the normalized flame luminosity $\Theta$ is inversely proportional to Reynolds number, hence $$\Theta \alpha \left( \frac{C_1}{P_o} \right)^{-1} \quad (13)$$

In other words, one should be able to increase flame luminosity by increasing the perimeter of the fuel nozzle, or by firing without a precombustor for which case the coefficient $C_1$ is lower. Furthermore, it is reasonable to believe that the coefficient $C_1$ is a function of the precombustor length $L_p$ as well as the hydraulic diameter ratio $d_p$, i.e.

$$C_1 = f \left\{ L_p, \left( \frac{d_p}{d_o} \right)^{-1} \right\} \quad (14)$$

The relationship in equation (14) shows that luminosity of a flame can be increased by reducing the length of the precombustor or by increasing the precombustor vs. nozzle hydraulic diameter ratio. For the sake of simplicity, only the cases with and without precombustors are discussed here assuming that $C_1=4$, for $L_p=0$, i.e. w/o precombustor 10.8, for $0<L_p<24$ in, i.e. w/precombustor The preferred embodiment of the present invention, shown in FIGS. 5 and 6, comprises a burner with a generally rectangular-cross-section of the fuel and oxygen passages. The burner can be integrated with a moderately diverging precombustor of similar geometry as shown in FIG. 5.

Referring to FIG. 5a, the burner 40 according to the present invention has a generally flat shape with a generally rectangular cross section as shown in FIG. 5b. Burner 40 has a housing 42 which coaxially surrounds a fuel conduit 44. Housing 42 has a flame or nozzle end 46 which may terminate in the same plane as the nozzle end 48 of the fuel conduit 44. The position of the nozzle end 48 of the fuel conduit 44 relative to the burner housing can be varied to optimize burner performance. Fuel conduit 44 and housing 40 have complementary shapes and are arranged so that a passage exists between the housing 42 and the fuel conduit 44 for the introduction of oxygen into the burner 40. Natural gas or other fuel is introduced into the fuel conduit so that at the combustion end 46 of the housing 42 of burner 40 a flame is produced having a generally flat rectangular configuration consisting of a fuel-rich core surrounded by an oxygen-rich (fuel lean) sheath as disclosed in U.S. Pat. Nos. 5,256,058 and 5,346,390 mentioned above. The burner according to the present invention includes a precombustor 50 which is disposed on the flame end 46 of housing 42 of the burner 40. Precombustor 50 has a central conduit or passage 52 which has a shape similar to the shape of the flame end of the burner 40. Passage 52 can be the same size (cross section) as the flame end 46 of housing 42 or can be larger as will hereinafter be explained. Passage 52 can be either converging or diverging, i.e., a straight passage with the top and bottom walls which are the elongated walls being parallel. As shown in FIG. 5c, the top and bottom walls 54 and 56, respectively, of precombustor 50 can be diverging. In this case the angle of divergence is measured on either side of a central axis 58, as shown in FIG. 5c. In addition, as shown in FIG. 5d, the vertical walls 60, 62 of precombustor 50 can be diverging with an angle of divergence measured on either side of a central axis 64, as shown in the drawing. When a precombustor 50 is used with the burner 40, the position of the nozzle end 48 of the fuel conduit 44 can be varied to optimize the performance or the burner system. For example, the nozzle end 48 of fuel conduit 44 can be positioned at varying locations from a point inside said burner housing 42 to the precombustor end.

Figure 6A:
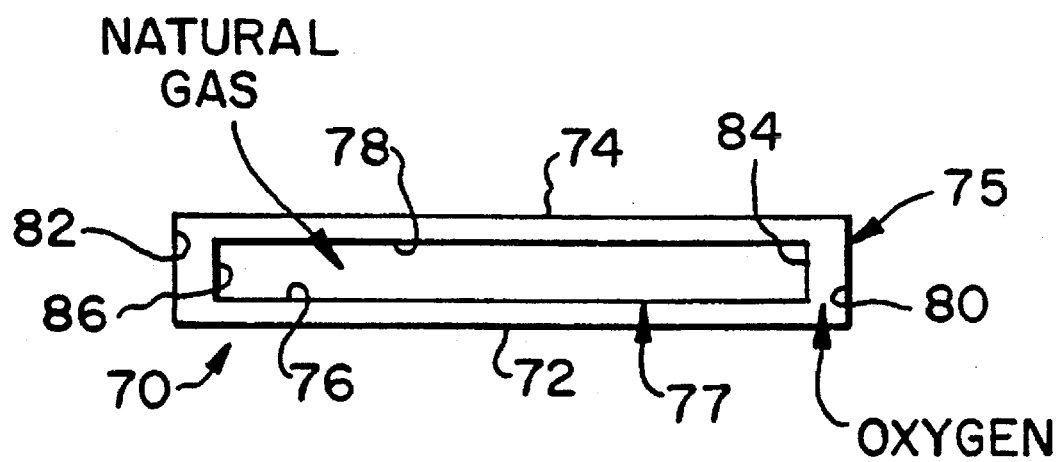
FIG. 6a is a schematic representation of the flame end of an alternate embodiment burner according to the present invention.
Figure 6B:
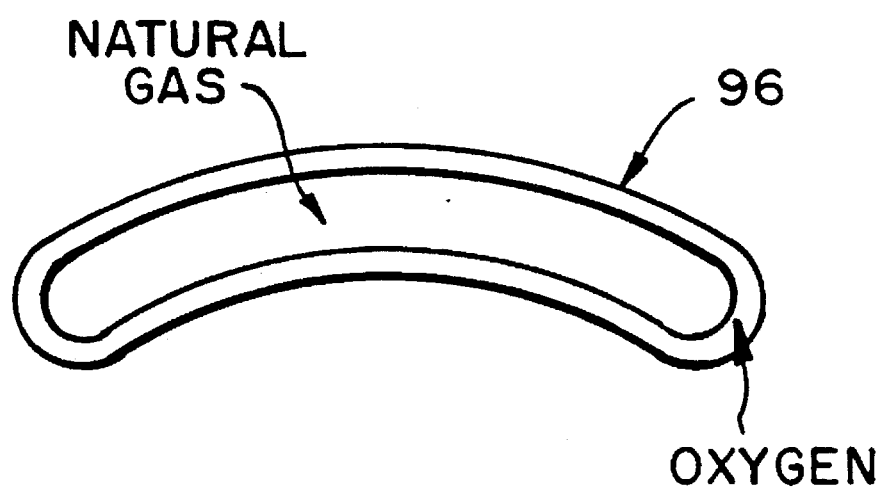
FIG. 6b is a schematic representation of yet another embodiment of the flame end of a burner in accord with the present invention.
Figure 7:
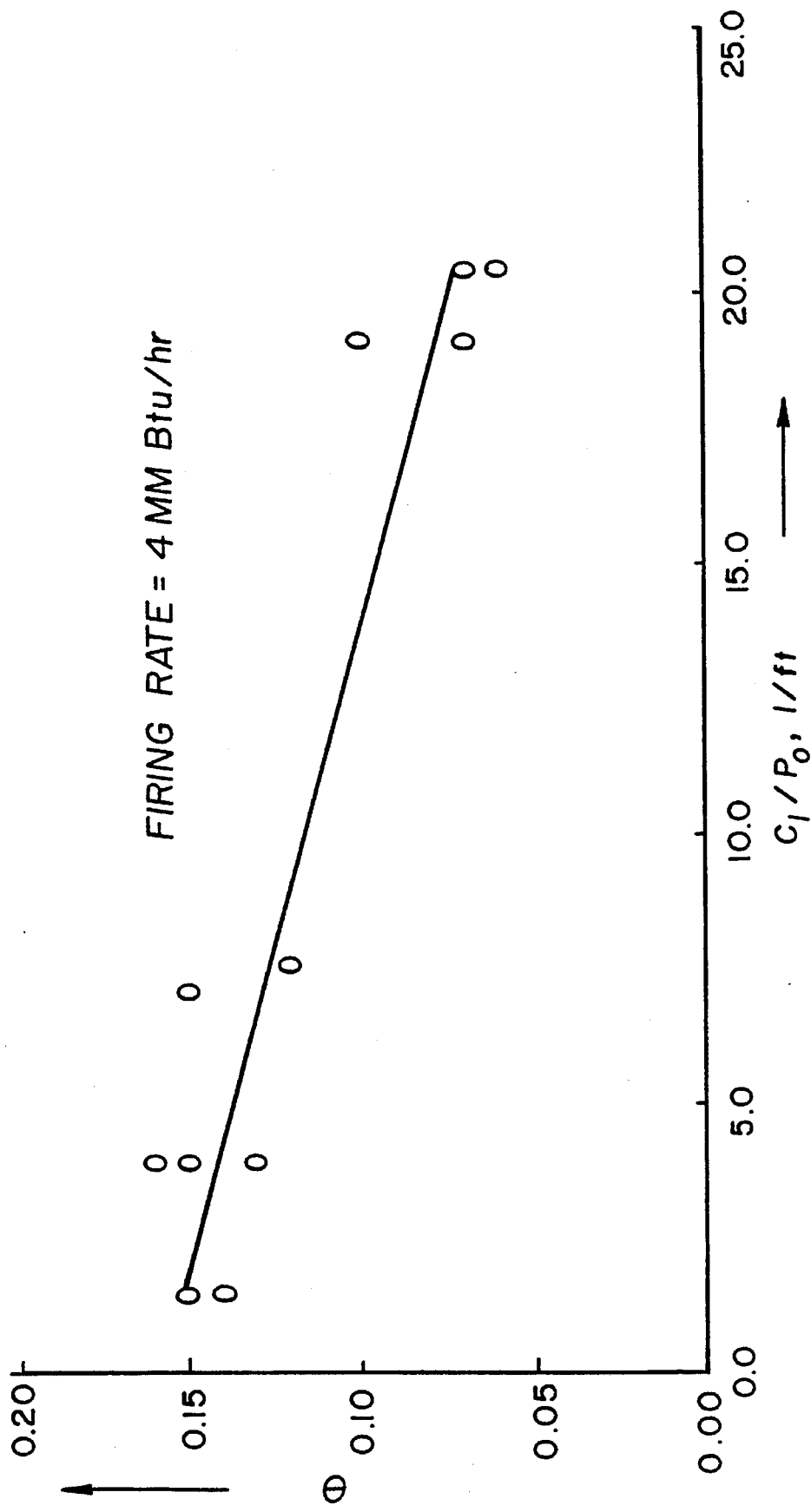
FIG. 7 is a plot of flame luminosity against the ratio of the constant to the perimeter of the fuel nozzle for a burner fired at 4 million Btu/hr.
Figure 8:
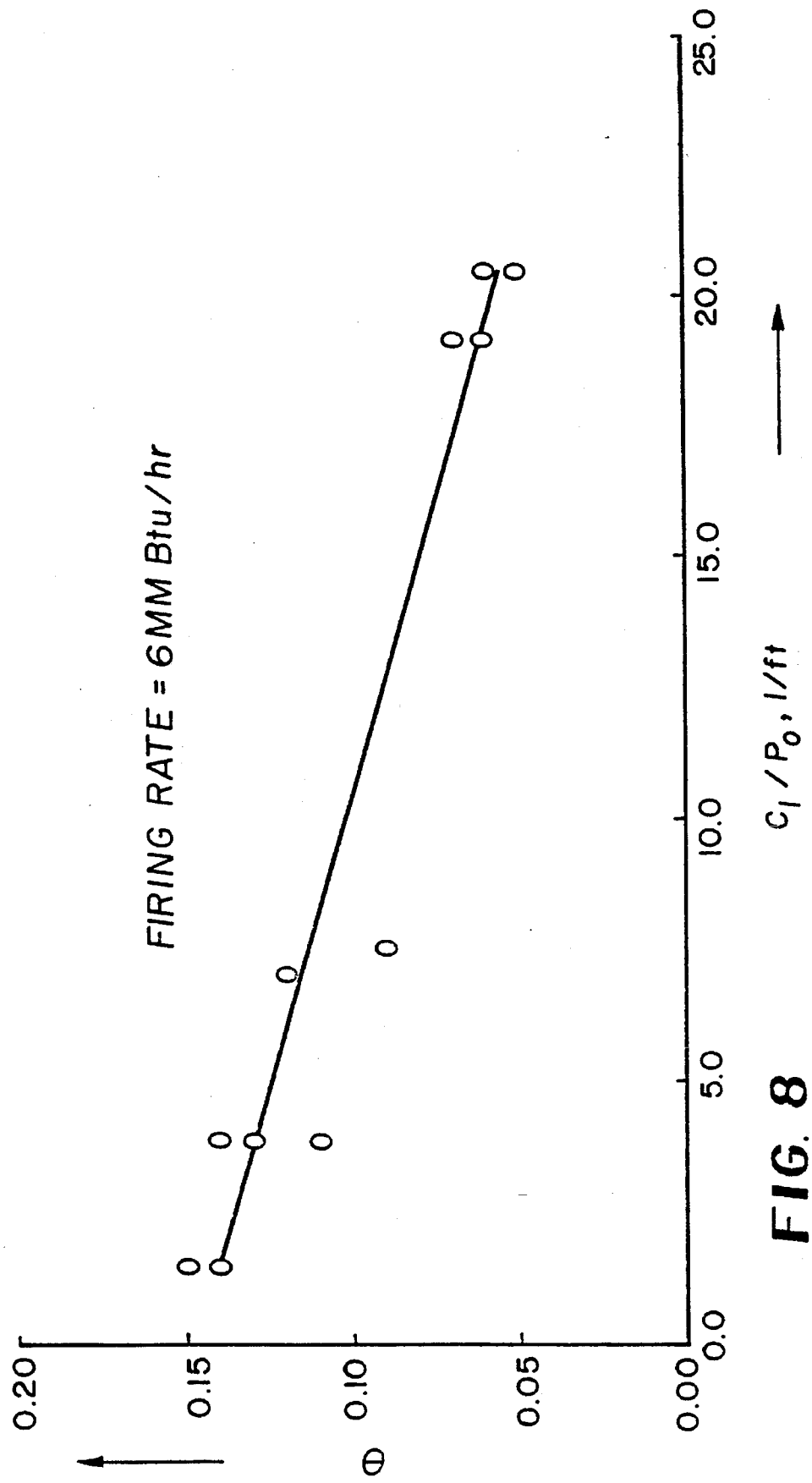
FIG. 8 is a plot of flame luminosity against the ratio of the constant to the perimeter of the fuel nozzle for a burner fired at 6 million Btu/hr.
Figure 9:
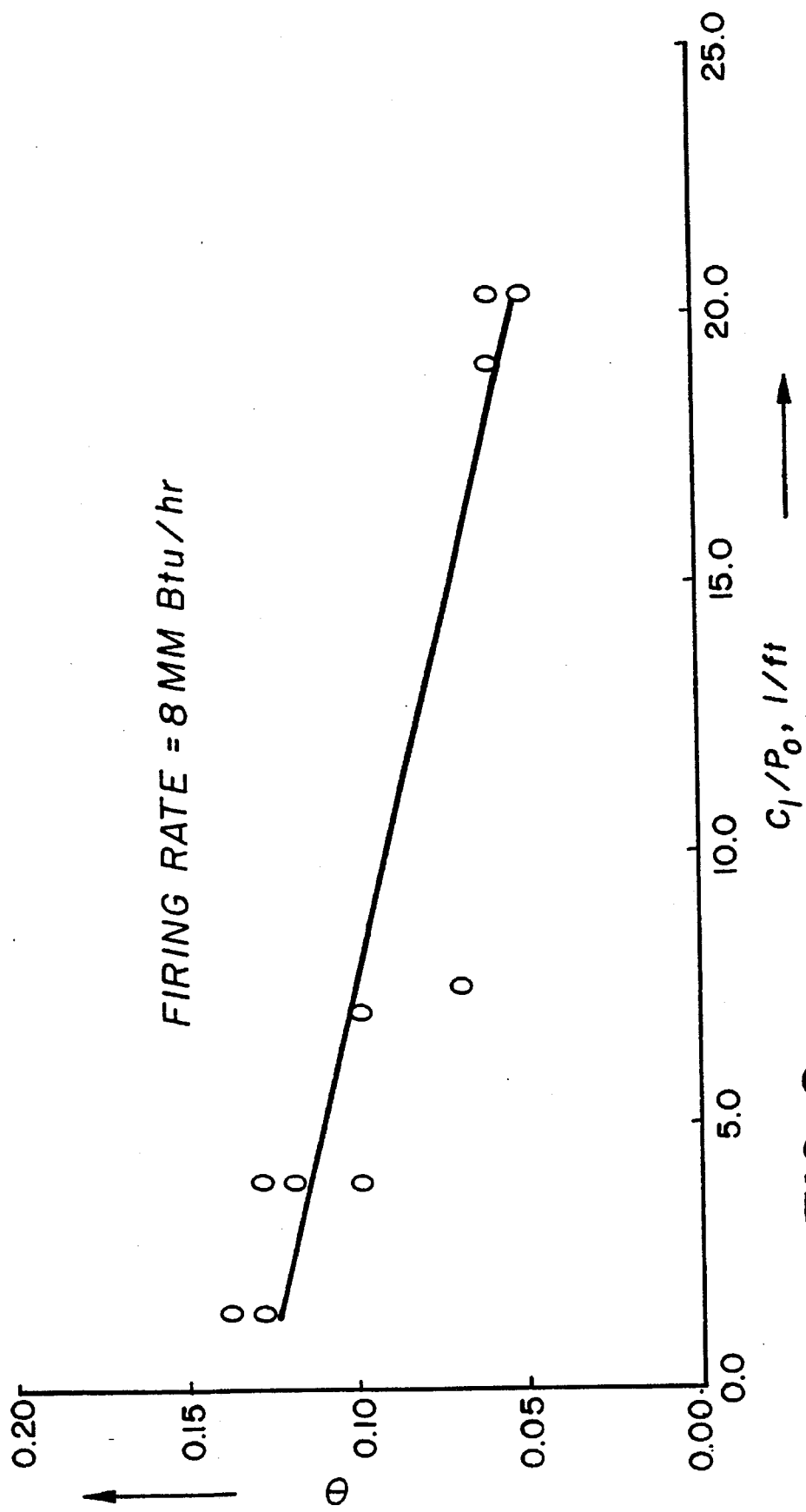
FIG. 9 is a plot of flame luminosity against the ratio of the constant to the perimeter of the fuel nozzle for a burner fired at 8 million Btu/hr.
Figure 10:
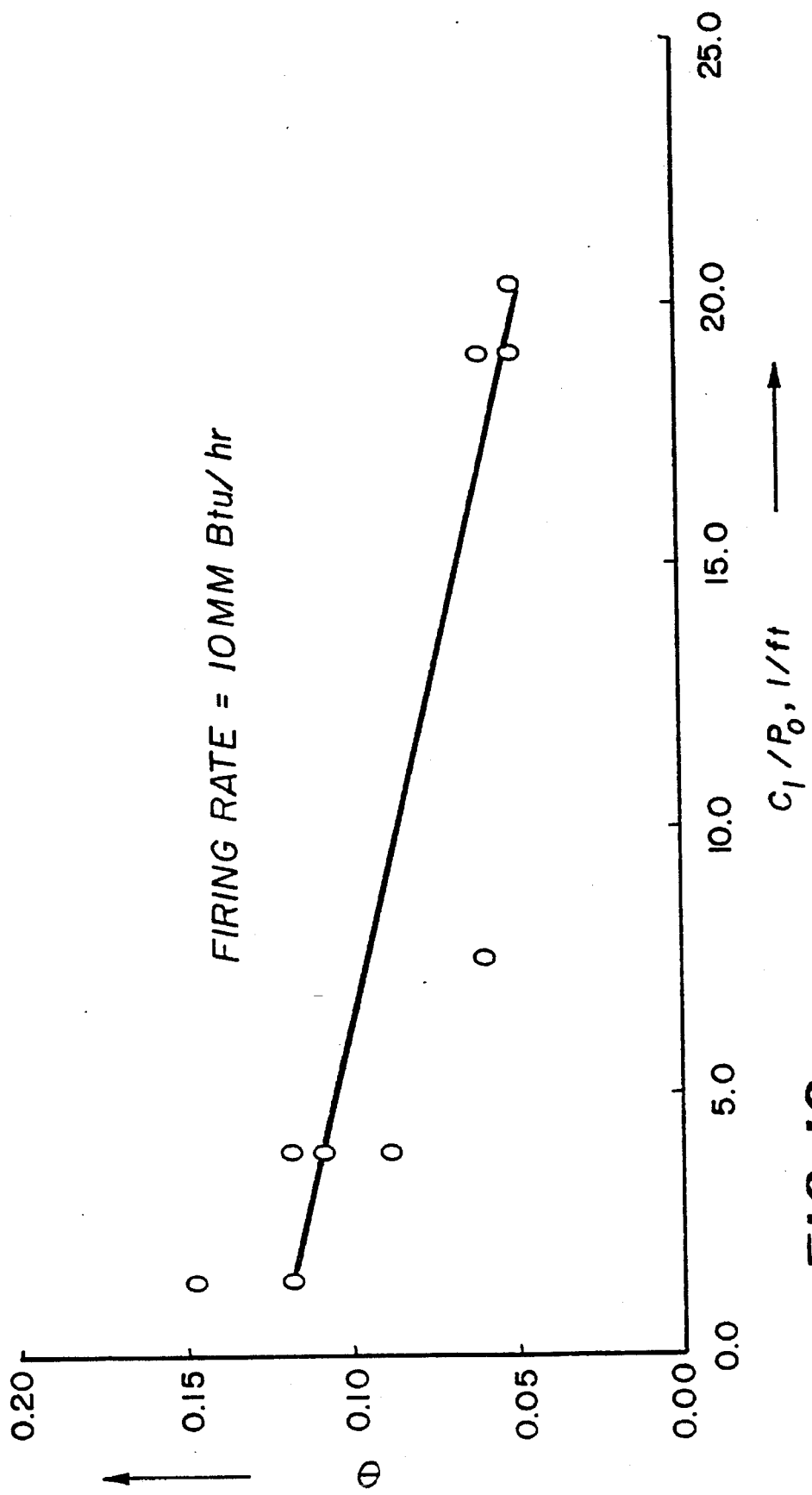
FIG. 10 is a plot of flame luminosity against the ratio of the constant to the perimeter of the fuel nozzle for a burner fired at 10 million Btu/hr.

The method of the present invention can be summarized as follows: to produce high-luminosity flame, a burner with natural gas in the center and oxygen surrounding it, should have nozzles having a generally rectangular cross section, so that the fuel nozzle $C_1/P_o<27$ l/ft where $C1 = \begin{cases} 4, & \text{without precombustor} \\ 10.8, & \text{with precombustor} \end{cases}$ Possible variation of the shape of the burner nozzle are shown in FIGS. 6a and 6b. Similar design variations could be applied to the burner precombustor shape.

FIG. 6a shows a rectangular shaped nozzle end for burner 70 where the horizontal walls 72, 74 of the housing 75 and the horizontal walls 76, 78 of the fuel conduit nozzle 77 are parallel to each other as are the vertical walls 80, 82 of housing 75 and vertical walls 84, 86 of fuel conduit nozzle 77. FIG. 6b shows an arctuate shape for the flame end of burner 96 which is arranged similar to burner 40 of FIG. 5 except that the burner has a radius of curvature perpendicular to the longitudinal axis of the burner.

Table I summarizes design and operating parameters of a burner according to the present invention which will produce high-luminosity flat-shaped flames having a fuel rich core surrounded by an oxyen-rich (fuel lean) sheath.

TABLE 1

| Parameter | Minimum | Preferred Range | Maximum |
|---|---|---|---|
| $C_1/P_o$, 1/ft | — | 0–22 | 27 |
| Firing Rate, MM Btu/hr | 0.5 | 1–20 | 40 |
| Fuel Nozzle Width/Height (w/h) | 2 | 5–30 | 60 |
| Velocity Fuel, ft/s | 10 | 40–200 | 400 |
| Velocity $O_2$, ft/s | 10 | 40–200 | 400 |
| Velocity $O_2$/Velocity Fuel | 0.3 | 0.8–1.2 | 2 |
| Fuel Nozzle Width, in | 4 | 8–24 | 40 |
| Stoichiometry with Natural Gas | 1.0 | 1.0–2.0 | 3.0 |
| Equivalence Ratio[1] | 2.0 | 1.0–2.0 | 0.7 |
| Hydraulic Diameter Ratio $\frac{d_p}{d_o}$ | 1 | 2–4 | 6 |
| Precombustor Length, in | 0 | 4–18 | 24 |
| Precombustor Horizontal Divergence Angle $\alpha$, deg[2] | −15° | 0°–+15° | +30° |
| Precombustor Vertical Divergence Angle $\beta$, deg[2] | −15° | 0°–+5° | +20° |

[1] Equivalence Ratio = $\frac{[\text{fuel/oxygen}]_{actual}}{[\text{fuel/oxygen}]_{theoretical}}$
[2] Angle with respect to longitudinal axis of precombustor Based on the discoveries summarized above, several burner configurations were tested to demonstrate the effect of the $C_1/P_o$ parameter on the flame luminosity. Also, two independent tests were conducted to check the reproducibility of the measurements. The burner design and operating parameters and the test results are summarized in Table 2 below.

TABLE 2

| Burner Configuration | F. Rate MM Btu/hr | $v_o$ ft/s | $d_r$ in | $C_1$ | $C_1/P_o$ 1/ft | Re | $\Theta$ Test 1 | $\Theta$ Test 2 |
|---|---|---|---|---|---|---|---|---|
| Rectangular Burner | 4 | 15 | 3.8 | 10.8 | 3.9 | 26330 | 0.15 | 0.16 |
| Nozzle, with $\alpha = 15°$ | 6 | 23 | 3.8 | 10.8 | 3.9 | 36650 | 0.14 | 0.14 |
| $\beta = 0°$ precombustor | 8 | 30 | 3.8 | 10.8 | 3.9 | 45360 | 0.13 | 0.12 |
| $d_p/d_o = 3.3$ | 10 | 38 | 3.8 | 10.8 | 3.9 | 52860 | 0.12 | 0.11 |
| w/h = 24.4 | | | | | | | | |
| Rectangular Burner | 4 | 15 | 3.7 | 10.8 | 3.9 | 25610 | 0.13 | 0.13 |
| Nozzle, with $\alpha = 0°$ | 6 | 23 | 3.7 | 10.8 | 3.9 | 35660 | 0.13 | 0.11 |
| $\beta = 0°$ precombustor | 8 | 30 | 3.7 | 10.8 | 3.9 | 44130 | 0.12 | 0.10 |
| $d_p/d_o = 3.2$ | 10 | 38 | 3.7 | 10.8 | 3.9 | 51430 | 0.11 | 0.09 |
| w/h = 24.4 | | | | | | | | |
| Rectangular Burner | 4 | 15 | 1.3 | 4.0 | 1.4 | 8840 | 0.15 | 0.14 |
| Nozzle, | 6 | 23 | 1.3 | 4.0 | 1.4 | 13320 | 0.15 | 0.14 |
| without precombustor | 8 | 30 | 1.3 | 4.0 | 1.4 | 17730 | 0.14 | 0.13 |
| w/h = 24.4 | 10 | 38 | 1.3 | 4.0 | 1.4 | 22150 | 0.15 | 0.12 |
| Cylindrical Burner Nozzle, | 4 | 50 | 4.5 | 10.8 | 20.4 | 74620 | 0.06 | 0.07 |
| with cylindrical | 6 | 75 | 4.5 | 10.8 | 20.4 | 92630 | 0.05 | 0.06 |
| 5 in i.d. recombustor | 8 | 100 | 4.5 | 10.8 | 20.4 | 104900 | 0.05 | 0.06 |
| $d_p/d_o = 2.5$ | 10 | 125 | 4.5 | 10.8 | 20.4 | 113700 | 0.05 | 0.05 |
| Cylindrical Burner Nozzle, | 4 | 50 | 5.4 | 10.8 | 20.4 | 89570 | 0.07 | 0.10 |
| with cylindrical | 6 | 75 | 5.4 | 10.8 | 20.4 | 111200 | 0.06 | 0.07 |
| 6 in i.d. recombustor | 8 | 100 | 5.4 | 10.8 | 20.4 | 125900 | 0.06 | 0.06 |
| $d_p/d_o = 3.0$ | 10 | 125 | 5.4 | 10.8 | 20.4 | 136500 | 0.05 | 0.06 |
| Cylindrical Burner Nozzle, | 4 | 50 | 2.0 | 4.0 | 7.6 | 46610 | 0.12 | 0.15 |
| without precombustor | 6 | 75 | 2.0 | 4.0 | 7.6 | 69920 | 0.09 | 0.12 |
| | 8 | 100 | 2.0 | 4.0 | 7.6 | 93220 | 0.07 | 0.10 |
| | 10 | 125 | 2.0 | 4.0 | 7.6 | 116530 | 0.06 | — |

A plot of flame luminosity e vs. Reynolds Number is given in FIG. 3. Plots of e vs. $C_1/P_o$ and best linear fits for firing rates of 4, 6, 8, and 10 MM Btu/hr are shown in FIGS. 7 through 10. FIGS. 7–10 show that the flame luminosity increases as $C_1/P_o$ decreases regardless of the firing rate of the burner.

Figure 11:
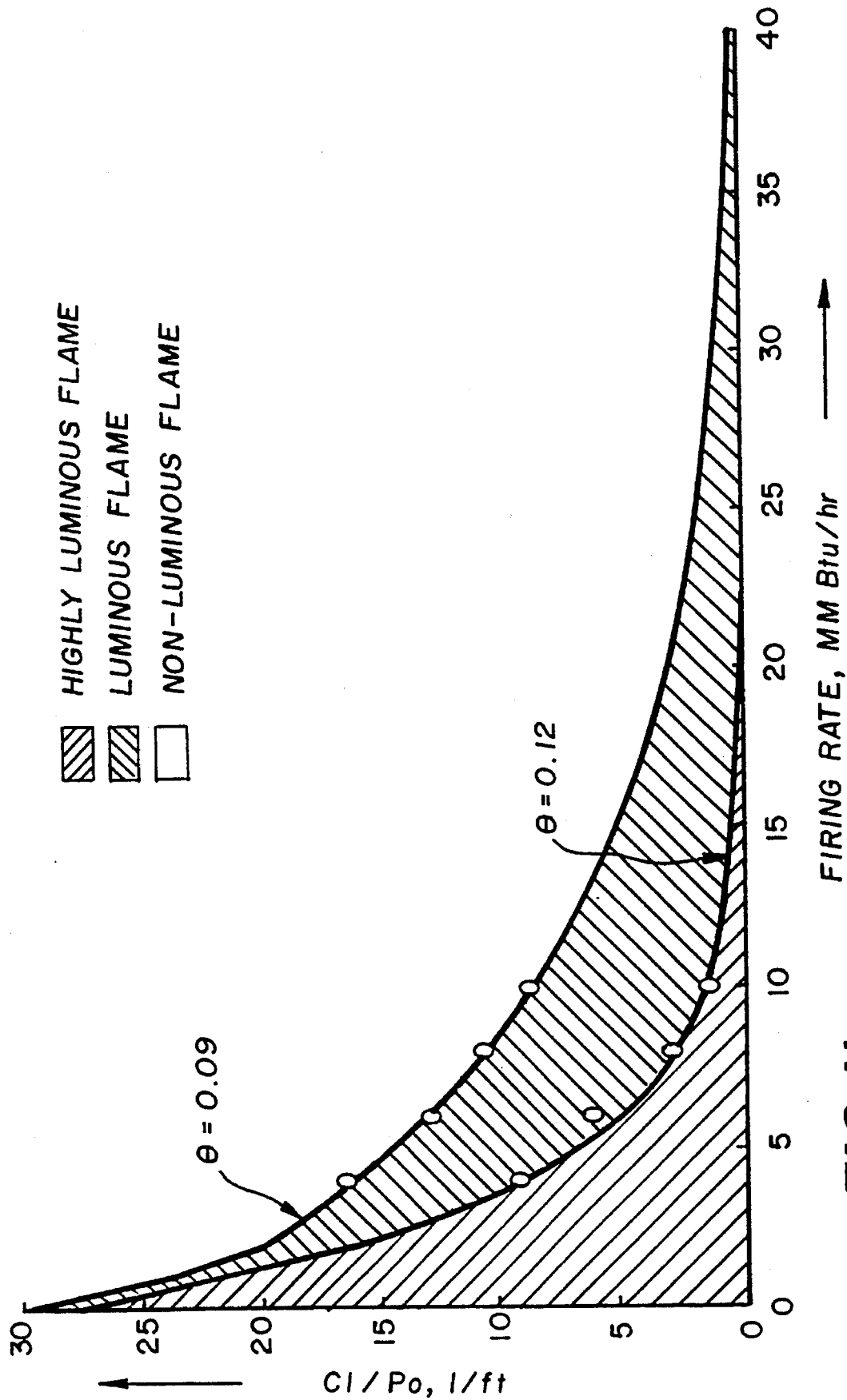
FIG. 11 is a plot of the ratio of the constant to the perimeter of the fuel nozzle against firing rate, thus illustrating flame luminosity regions.

To illustrate that burners of the present invention always produce higher flame luminosity than a round burner, it is assumed, based on flame observations, that:

for $\Theta<0.09$ the flame is non-luminous, for $0.09<\Theta<0.12$ the flame is luminous, and for $\Theta>0.12$ the flame is highly luminous The values for $C_1/P_o$ at $\Theta=0.09$ and $\Theta=0.12$ are plotted for different firing rates and fitted with exponential curves in FIG. 11. When extrapolated, the two curves define three regions corresponding to varying degrees of flame luminosity.

As discussed previously, underfiring of a round tube-in-a-tube configuration, i.e. operating a burner at or below minimum designed firing rate, maximizes the flame luminosity with that type of burner. Assuming $v_o = 20$ ft/s as fairly representing the underfiring lower velocity limit, the curves for a round and flat flame burner (w/h=40) configurations are compared in FIG. 12.

Figure 12:
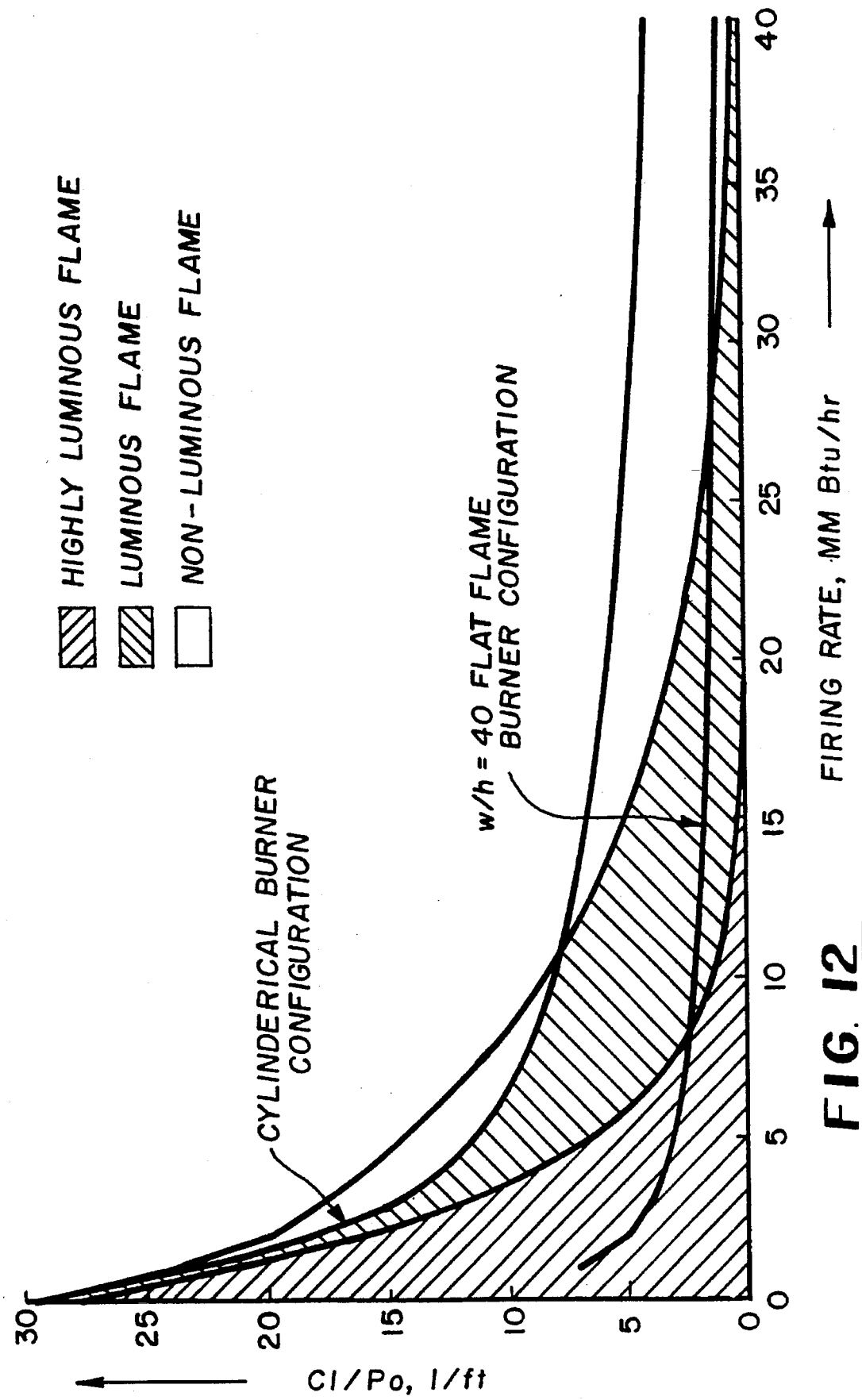
FIG. 12 is similar to the plot of FIG. 11 with the addition of curves indicating a round burner with a precombustor and a flat flame burner according to the present invention with a precombustor, wherein the average natural gas velocity at the exit end of the nozzle is 20 feet/sec.

It may be seen from FIG. 12 that the round burner configuration can only produce flames close to high luminosity at the low end of the firing rate. Also, the round configuration produces non-luminous flames at firing rates greater than 10 MM Btu/hr even if the velocity is kept fixed at the extremely low rate of 20 ft/s. The flat flame burner with a w/h=40 with a flat flame configuration produces highly luminous and luminous flames up to 8 and 26 MM Btu/hr, respectively.

The flame luminosity comparison is even more favorable to the flat flame burner configuration at higher fuel nozzle velocities. For example, at $v_o=40$ ft/s the round configuration cannot produce a luminous flame at any firing rate as shown in FIG. 13. At the same time, the flat flame burner with the w/h=40 configuration still produces highly luminous and luminous flames up to 5 and 15 MM Btu/hr, respectively. At even higher nozzle velocities this comparison is even more in favor of the w/h=40 burner configuration.

Similar conclusions can be made for other nozzle velocities as well as burner configurations without a precombustor.

Thus, according to the present invention a burner and a method of operating a burner results in very intense flame radiation, i.e., higher heating efficiency from efficient soot formation. This is coupled with better flame coverage of the furnace load resulting from the flat flame shape. The precombustor passage can have a combination of straight and angular wall configurations to control flame shape and direction (coverage). For example, in a glass melting furnace there will be better coverage of the molten bath of glass. Burners and methods of operating, according to the present invention, result in lower $NO_x$ formation because of the lower flame temperature. The present invention permits better control of the flame coverage by varying the precombustor shape. In addition to the foregoing, burners according to the present invention do not have to be water cooled, thus there is no corrosion of the burner, burner nozzles, and burner bodies because there is a cool precombustor or burner block and a low momentum flame.

According to the present invention, low reacting gas velocities cause delayed mixing combustion to produce the luminous flame, especially with a relatively large perimeter for the generally rectangular cross section of the fuel nozzle, e.g., the preferred embodiment of the invention. Combusting gases expand due to their increasing temperature and conform to the shape of the precombustor, which for better heating efficiency, has a complementary or like cross section.

Having thus described our invention is desired to be secured by Letters Patent of the United States is set forth in the appended claims.

What is claimed:

1. An oxy-fuel burner for producing a generally flat luminous flame comprising in combination:

a housing having a first end and a flame end said housing having a cross-sectional shape with a width and height of different dimension;

a fuel conduit having a first end and a nozzle end disposed in spaced relation to and generally concentrically within said housing said fuel conduit having a cross-sectional shape complementary to that of said housing thus defining a passage between said fuel conduit and said housing, said fuel nozzle having a width to height ratio of between 2 and 60, said nozzle end of said fuel conduit and said flame end of said housing adapted for positioning relative to each other along a longitudial axis of said housing; and means to introduce fuel into said fuel conduit and an oxidizer into said passage between said fuel conduit and said housing, whereby a flame having a fuel rich core surrounded by an oxygen rich sheath is produced at the nozzle end of said fuel conduit.

2. An oxy-fuel burner according to claim 1 wherein said width to height ratio of said fuel nozzle is between 5 and 30.

3. An oxy-fuel burner according to claim 1 adapted to operate at a firing rate of between 0.5 and 40 million Btu/hr.

4. An oxy-fuel burner according to claim 1 adapted to operate at a firing rate of between 1 and 20 million Btu/hr.

5. An oxy-fuel burner according to claim 1 wherein the width of the fuel nozzle is between 4 and 40 inches.

6. An oxy-fuel burner according to claim 5 wherein the width of the fuel nozzle is between 8 and 24 inches.

7. An oxy-fuel burner according to claim 1 wherein said housing and said fuel conduit have generally rectangular cross-sections.

8. A burner accordingly to claim 1 wherein said housing and fuel conduit have generally arctuate elongated cross-sections.

9. An oxy-fuel combustor system comprising in combination:

an oxy-fuel burner having a housing having a first end and a flame end, said housing having a cross-sectional shape with a width and height of different dimensions, a fuel conduit having a first end and a nozzle end disposed in spaced relation to and concentrically within said housing, said fuel conduit having a cross-sectional shape complementary to that of said housing thus defining a passage between said fuel conduit and said housing, said fuel nozzle having a width to height ratio of between 2 and 60;

a precombustor mounted on said burner, said precombustor having a central passage complementary to and of a width and height equal to or larger than the width and height of said burner housing said precombustor having a first end in fluid tight relation to the flame end of said housing and a second end adapted to direct said flame produced by said burner for heating in industrial environments, the longitudial axis of said precombustor being an extension of the longitudial axis of said housing of said burner, said precombustor having a length of from 1 to 24 inches; and means to introduce fuel into said fuel conduit of said burner and an oxidizer into said passage defined by said housing and said nozzle conduit, whereby a flame having a fuel rich core surrounded by a oxygen rich sheath is produced at the flame end of said precombustor.

10. A burner system according to claim 9 wherein said precombustor is between 4 and 18 inches in length.

11. A burner system according to claim 9 wherein said nozzle has a width to height ratio of between 5 and 30.

12. A burner system according to claim 9 wherein the ratio of the hydraulic diameter of the flame end of the precombustor to the hydraulic diameter of the fuel nozzle in between 1 and 6.

13. A burner system according to claim 12 wherein the ratio is between 2 and 4.

14. A method of producing a low $NO_x$ oxy-fuel flame for heating a furnace to an elevated temperature comprising the steps of: producing an oxy-fuel flame of the type wherein a core of a fuel rich phase is surrounded by a sheath of a fuel lean phase by using a post mix concentric passage oxy-fuel burner to produce said flame by causing fuel to exit a central passage and oxygen to exit a complementary passage surrounding said central passage said passages each having a width to height ratio of between 2 and 60 said fuel and oxygen exiting said burner at a minimum velocity of 15 ft/sec.; and introducing the generally flat, highly luminous flame having a fuel rich core surrounded by a fuel lean sheath into said furnace.

15. A method according to claim 14 wherein said velocity for fuel and oxygen exiting said burner is greater than 20 ft/sec.

16. A method according to claim 14 wherein said flame is directed into a precombustor disposed on said burner said precombustor having a shape complementary to and of a size equal to or greater than that of said passage surrounding said fuel passage, wherein said flame extends throughout the length of said precombustor without significant combustion occurring on the wall forming the precombustor.

17. A method according to claim 16 wherein said precombustor directs said flame for a distance not to exceed 24 inches.

* * * * *